Sept. 11, 1934.   O. MIÖEN   1,973,495
HORSESHOE WITH EXCHANGEABLE CALKS
Filed July 11, 1933
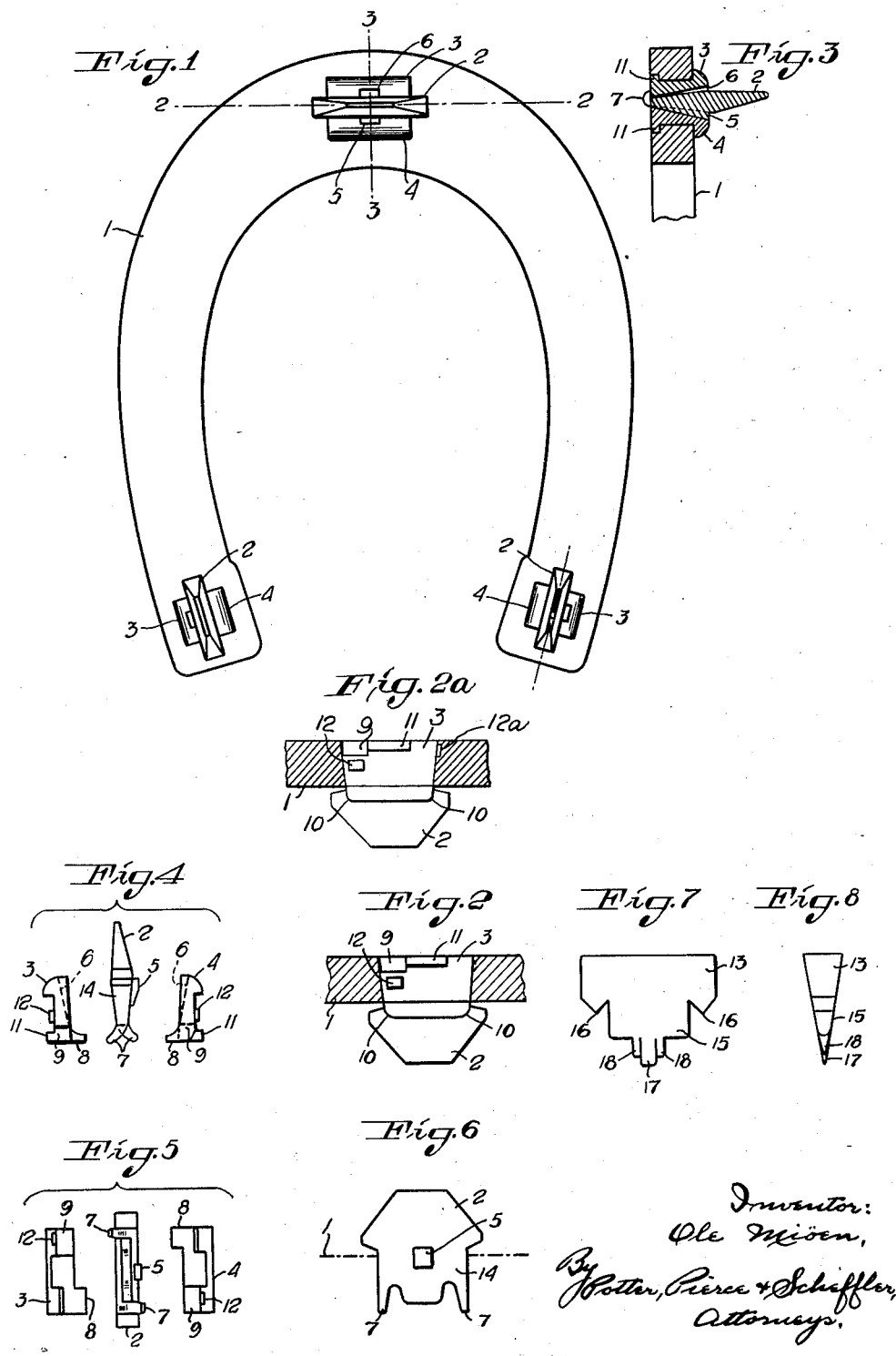
Inventor:
Ole Miöen,
By Potter, Pierce & Schiffler,
Attorneys.

Patented Sept. 11, 1934

1,973,495

UNITED STATES PATENT OFFICE 1,973,495

HORSESHOE WITH EXCHANGEABLE CALKS

Ole Miöen, Appelviken, Sweden

Application July 11, 1933, Serial No. 679,941
In Sweden July 16, 1932

14 Claims. (Cl. 168—43)

The present invention refers to horse shoes with exchangeable calks comprising a wedge member and holding members therefor, said wedge member being provided with bendable tangs on the end thereof intended to be driven into the horse shoe, which tangs are bent, when the wedge member is driven home, so as to engage recesses and projections on the holding members.

The invention has for its object to insure the retention of the holding members in the horse shoe, even when a wedge member is not driven in between the holding members.

The invention consists substantially in that the holding members are made to be introduced into corresponding holes of a rectangular shape in the horse shoe, from the hoof side of the latter, and in that the holding members are formed so that when introduced into the hole they are locked by a wedge action or engagement against the short sides of the hole.

Preferably, the holding members may also be provided with projections on the end thereof directed toward the hoof side, said projections engaging corresponding recesses in the hoof side of the horse shoe, the thickness of two adjacent holding members being greater than the width of the hole in the horse shoe when measured over the said projections.

Further features characteristic of the invention will be described more fully in the following with reference to the embodiment of the invention illustrated on the accompanying drawing.

Fig. 1 is a plan view of a horse shoe viewed from the ground side. Fig. 2 is a longitudinal section of the fore part of the horse shoe with the front calk on line 2—2 of Fig. 1. Fig. 2a is a view similar to Fig. 2, but illustrating a modification. Fig. 3 is a transverse section on the line 3—3 of Fig. 1. Fig. 4 shows the wedge member and the holding members each per se viewed from the end, and Fig. 5 shows the same parts viewed from below. Fig. 6 shows the wedge member in elevation. Figs. 7 and 8 are an elevation and an end view respectively of a jolting tool.

In the drawing, 1 designates the horse shoe which is provided in known manner with a front calk and two rear calks, all of which are exchangeable. The calks each consist of the wedge member 2 and the holding members 3 and 4. The wedge member is provided with a key 5, and the holding members are provided with corresponding grooves 6 to effect a safe attachment. The wedge member 2 is furthermore provided with two bendable tangs 7, while the holding members 3 and 4 are fitted with corresponding projections 8 and recesses 9 in such a manner that the tangs of the wedge member are bent toward opposite sides when the wedge member is driven home, as will be clearly seen from Figs. 4 and 5.

As will be seen from Fig. 2, the holding members are slightly tapering and provided on the ground side with rounded or bevelled corners 10. The holding members are preferably tough-tempered, the corresponding holes in the horse shoe being preferably made in such a manner that the end of the holding member directed against the ground can be placed in the hole without squeezing. After the holding member has been introduced into the hole so far as to be guided thereby, the still projecting part thereof should be so dimensioned that further introduction of the holding member into the place to be occupied thereby must be effected by driving, the holding members being then wedged in the hole so as to be securely retained, even if the wedge member 2 be removed. This introduction of the holding members is readily effected on account of the fact that the tempered holding member forces the comparatively soft material of the horse shoe aside without difficulty.

To further ensure the retention of the holding members in the horse shoe when the wedge member is removed, the holding members may be provided with projections 11 on the outer side and on the end thereof directed against the hoof side, said projections engaging corresponding recesses in the hoof side of the horse shoe, the thickness of two adjacent holding members in contact with one another having then to be greater than the width of the hole in the horse shoe when measured over said projections, as will be seen from Fig. 3.

The arrangement involving securing of the holding members 3, 4 by a wedge action against the short sides of the hole is of particular necessity in connection with holding members having a recess 9 on the one side and a projection 8 on the other side, as illustrated in Figs. 4 and 5. This is so for the reason that during the driving of the wedge member 2 into the horse shoe the tangs 7 of the wedge member will force the projections 8 inwardly in the hole of the horse shoe and the recesses 9 outwardly, so that the holding members are apt to take an oblique position in the holes should the fit not be accurate in the longitudinal direction.

In order to avoid said oblique position, especially when said fit is not quite accurate, the holding members may be provided with a boss-like projection 12 on the side of the member provided with the recess 9. Said projection is then caused to cut into the material of the horse shoe when the holding member is driven home. Obviously, such a projection may instead be provided in the form of an increase of the width of the holding member, as indicated at 12a in Fig. 2a. In this case, the material of the horse shoe may be jolted or tamped, after the driving-in operation, over the groove that has been cut by said boss, whereby the holding member is also prevented from displacement in a direction inwardly toward the hoof.

Figs. 7 and 8 show a tool intended to jolt or tamp in the material of the horse shoe between the holding members after the latter have been introduced into the horse shoe.

This tool consists of an upper wedge-shaped part 13 having a wedge angle corresponding to that of the part 14 on the wedge member 2 driven into the horse shoe, Figs. 4 and 6, and a width which is greater than the width of said wedge part 14. Adjoining the part 13 is a part 15 of a width somewhat less than that of the wedge part 14. In the angles between the parts 13 and 15 and on the lower side of the part 13 there are formed edges 16 intended to press in the material of the horse shoe at the short ends of the hole when the tool is driven into the hole of the horse shoe between the holding members 3, 4 placed therein. In order to fix the position of the tool when it is introduced between the holding members, there is provided at the lower end of the tool a centrally arranged narrow wedge-shaped part 17 fitting the recesses 6 in the holding members. Laterally of this part 17 there are furthermore provided a pair of short wedge-shaped parts 18 intended together with part 17 to move the holding members apart when the tool is introduced between the holding members.

After the holding members have been introduced into the horse shoe 1 from the hoof side thereof as far as to the position shown in Figs. 1, 2 and 3, and the horse shoe has been placed on a suitable bed with the ground side thereof directed upwardly, the tool is introduced from above between the holding members 3, 4 and is then guided, as stated, in proper position through the engagement of the wedge part 17 into the recesses 6, the holding members being thus brought apart. The tool is then forcefully driven in between the holding members in a direction toward the upwardly directed ground side of the horse shoe, the edges 16 then hitting the material of the horse shoe in the proximity of the short ends of the hole and driving this material in between the holding members to an extent determined by the width of the driven-in tool part 15, which width, as stated, is somewhat less than the width of the wedge part 14, so that when the wedge member 2 is afterwards driven in, the wedge member will press the driven-in portions of the material of the horse shoe somewhat to the sides so as to obtain a secure support laterally.

Applying the above mentioned arrangements for the retention of the holding members in the horse shoe even without a wedge member, the holding members may be mounted into the horse shoe already in the factory for the manufacture of the horse shoes, the holding members being so securely retained in the horse shoe that they cannot fall out even by the often careless handling which the horse shoe is subjected to in transport and the like. Besides, the insertion of the holding members into the horse shoe may be found inconvenient for the unskilled, it being thus of great advantage when this work is made by skilled workmen and with the aid of suitable mechanical means in the factory, prior to marketing the horse shoes.

These half-fitted horse shoes furthermore offer the advantage that the same can be assembled as summer and winter shoes without any exchange of wedge members already inserted into the shoe and not adapted for the season, so that special stocks of each kind of winter and summer shoes are obviated. This advantage is so much the greater as in the removal of the wedge members from the shoe the bendable tangs are easily destructed, so that a wedge member which has once been driven into the shoe cannot readily be kept for use on a later occasion, once it has been removed from the shoe.

What I claim is:—

1. A calk for a horseshoe provided with a calk-receiving opening, said calk comprising a wedge member, and a holding member complemental thereto and to said opening, and means on said holding member for engagement with a wall of said opening to prevent disengagement of said holding member from said shoe in the absence of said wedge member from said opening.

2. A calk for a horseshoe provided with a calk-receiving opening, said calk comprising a wedge member, and holding members complemental thereto and to said opening, and means on said holding members for engagement with the walls of said opening to prevent disengagement of said holding members from said shoe in the absence of said wedge member from said opening.

3. In combination with a horseshoe having elongated substantially rectangularly shaped calk-receiving openings therein, a pair of holding members made to be introduced into each opening from the hoof side of the horseshoe, and means for locking said holding members against the short sides of said opening when introducing the members into the opening.

4. In combination with a horseshoe having elongated substantially rectangularly shaped calk-receiving openings therein, a pair of holding members made to be introduced into each opening from the hoof side of the horseshoe, and wedge means for locking said holding members against the short sides of said opening when introducing the members into the opening.

5. In combination with a horseshoe having elongated substantially rectangularly shaped calk-receiving openings therein, a pair of holding members made to be introduced into each opening from the hoof side of the horseshoe, and catch means for locking said holding members against the short sides of said opening when introducing the members into the opening.

6. In combination with a horseshoe having elongated calk-receiving openings therein, each opening having a rectangular shape, a pair of holding members made to be introduced into each opening from the hoof side of the horseshoe, and wedge and catch means for locking said holding members against the short sides of said opening when introducing the members into the opening.

7. In combination with a horseshoe having elongated substantially rectangularly shaped calk-receiving openings therein, a pair of holding members made to be introduced into each opening from the hoof side of the horseshoe, and catch means for locking said holding members against the short sides of said opening when introducing the members into the opening, said catch means being located in proximity to the hoof side of the horseshoe.

8. In combination with a horseshoe having elongated substantially rectangularly shaped calk-receiving openings therein, a pair of holding members made to be introduced into each opening from the hoof side of the horseshoe, and wedge and catch means for locking said holding members against the short sides of said opening when introducing the members into the opening, said catch means being located in proximity to the hoof side of the horseshoe.

9. In combination with a horseshoe having elongated substantially rectangularly shaped calk-receiving openings therein, a pair of holding members made to be introduced into each opening from the hoof side of the horseshoe, and means for locking said holding members against the short sides of said opening when introducing the members into the opening, each holding member being provided with a projection at the end thereof directed towards the hoof side of the shoe, said projections engaging corresponding recesses at said hoof side of the shoe, the thickness of the two holding members placed adjacent to each other, when measured over the said projections, being greater than the width of said calk-receiving opening.

10. In combination with a horseshoe having elongated substantially rectangularly shaped calk-receiving openings therein, a pair of holding members made to be introduced into each opening from the hoof side of the horseshoe, and means for locking said holding members against the short sides of said opening when introducing the members into the opening, said holding members having rounded bevelled corners at the end to be first introduced into the opening.

11. In combination with a horseshoe having elongated substantially rectangularly shaped calk-receiving openings therein, a pair of holding members in each opening, and means for locking said holding members against the short sides of said opening.

12. In combination with a horseshoe having elongated substantially rectangularly shaped calk-receiving openings therein, a pair of holding members in each opening, means for locking said holding members against the short sides of said opening, and a wedge-shaped calk interposed between said holding members.

13. In combination with a horseshoe having elongated substantially rectangularly shaped calk-receiving openings therein, a pair of holding members in each opening, a projection and a recess at the sides of said holding members facing each other, means for locking the holding members against the short sides of said opening, and a wedge-member arranged between said holding members and forming a calk, said wedge member having bendable tangs engaging said projections and recesses of the holding members when introducing the wedge member between the holding members, so that the tangs will be bent and lock the wedge member to the holding members.

14. In combination with a horseshoe having elongated substantially rectangularly shaped calk-receiving openings therein, a pair of holding members in each opening, a projection and a recess at the sides of said holding members facing each other, means for locking the holding members against the short sides of said opening, and a wedge member arranged between said holding members and forming a calk, said wedge member having bendable tangs engaging said projections and recesses of the holding members when introducing the wedge member between the holding members, so that the tangs will be bent and lock the wedge member to the holding members, said holding members each being provided with a further projection on that side thereof where the recess is situated, said further projection adapted to cut into the material of the shoe when the wedge member is introduced between the holding members.

OLE MIÖEN.